(12) United States Patent
Powell (10) Patent No.: US 7,958,052 B2
(45) Date of Patent: Jun. 7, 2011

(54) METHODS AND SYSTEMS FOR CARDHOLDER INITIATED TRANSACTIONS

(75) Inventor: Jonathan Robert Powell, Rye Brook, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 12/257,766

(22) Filed: Oct. 24, 2008

(65) Prior Publication Data

US 2009/0171845 A1     Jul. 2, 2009

Related U.S. Application Data

(60) Provisional application No. 61/017,968, filed on Dec. 31, 2007.

(51) Int. Cl.
    *G06Q 40/00*        (2006.01)
    *G06Q 20/00*        (2006.01)

(52) U.S. Cl. .......................................... 705/44; 705/64
(58) Field of Classification Search .................. 705/44
See application file for complete search history.

(56) References Cited

U.S. PATENT DOCUMENTS

| | | | |
|---|---|---|---|
| 5,898,777 A | 4/1999 | Tycksen, Jr. et al. | |
| 6,125,352 A | 9/2000 | Franklin et al. | |
| 6,330,544 B1 * | 12/2001 | Walker et al. | 705/14.36 |
| 6,609,113 B1 * | 8/2003 | O'Leary et al. | 705/39 |
| 6,704,714 B1 | 3/2004 | O'Leary et al. | |
| 7,031,733 B2 | 4/2006 | Alminana et al. | |
| 7,076,329 B1 | 7/2006 | Kolls | |
| 7,127,264 B2 | 10/2006 | Hronek et al. | |
| 7,136,841 B2 * | 11/2006 | Cook | 705/75 |
| 7,245,905 B2 | 7/2007 | Kamdar et al. | |
| 7,251,495 B2 | 7/2007 | Keyani et al. | |
| 7,567,934 B2 * | 7/2009 | Flitcroft et al. | 705/37 |
| 7,580,898 B2 * | 8/2009 | Brown et al. | 705/75 |
| 7,584,153 B2 * | 9/2009 | Brown et al. | 705/75 |
| 7,707,120 B2 * | 4/2010 | Dominguez et al. | 705/78 |
| 2001/0034717 A1 * | 10/2001 | Whitworth | 705/64 |
| 2001/0037264 A1 | 11/2001 | Husemann et al. | |
| 2002/0174121 A1 | 11/2002 | Clemie | |
| 2003/0028481 A1 * | 2/2003 | Flitcroft et al. | 705/39 |
| 2003/0065615 A1 | 4/2003 | Aschir | |

(Continued)

OTHER PUBLICATIONS

Miriam Kreinin Souccar. "Amex Has Disposable Answer for Web Privacy." American Banker Sep. 8, 2000,Accounting & Tax Periodicals, ProQuest. Web. Jan. 15, 2011.*

(Continued)

*Primary Examiner* — Ella Colbert
*Assistant Examiner* — Mohammad Z Shaikh
(74) *Attorney, Agent, or Firm* — Armstrong Teasdale LLP (57) ABSTRACT

A cardholder-initiated financial transaction using a cardholder controlled input device in communication with a payment card network and a database is disclosed. The cardholder uses a payment card issued to the cardholder by an issuer bank. An exemplary method includes the steps of storing merchant data within the database including data identifying the merchants registered to utilize the card network and receiving from the input device transaction data relating to the financial transaction. The transaction data includes an authorization request and merchant identifying data that identifies the merchant involved in the transaction. The method further includes determining that the identified merchant is registered to utilize the card network by comparing the transaction data with the merchant data stored in the database, forwarding the authorization request to the issuer bank, receiving a response to the request from the issuer bank, and automatically forwarding the response to the input device.

33 Claims, 5 Drawing Sheets

U.S. PATENT DOCUMENTS

| | | |
|---|---|---|
| 2003/0139174 A1 | 7/2003 | Rao |
| 2003/0171993 A1 | 9/2003 | Chappuis |
| 2003/0194071 A1* | 10/2003 | Ramian ................ 379/114.19 |
| 2003/0200184 A1* | 10/2003 | Dominguez et al. ............ 705/78 |
| 2003/0212601 A1 | 11/2003 | Silva et al. |
| 2004/0019564 A1 | 1/2004 | Goldthwaite et al. |
| 2004/0048025 A1* | 3/2004 | Lohnes ........................ 428/40.1 |
| 2004/0214597 A1 | 10/2004 | Suryanarayanna et al. |
| 2005/0131826 A1* | 6/2005 | Cook ............................ 705/44 |
| 2005/0144020 A1 | 6/2005 | Muzaffar et al. |
| 2005/0238149 A1 | 10/2005 | De Leon |
| 2005/0240526 A1* | 10/2005 | Hill ................................ 705/40 |
| 2006/0006226 A1* | 1/2006 | Fitzgerald et al. ............ 235/380 |
| 2006/0080232 A1 | 4/2006 | Epps |
| 2006/0149644 A1 | 7/2006 | Sulmar et al. |
| 2006/0253339 A1 | 11/2006 | Singh et al. |
| 2007/0051797 A1* | 3/2007 | Randolph-Wall et al. .... 235/381 |
| 2007/0063017 A1* | 3/2007 | Chen et al. ................... 235/379 |
| 2007/0078759 A1* | 4/2007 | Lilly et al. ...................... 705/38 |
| 2007/0094135 A1 | 4/2007 | Moore et al. |
| 2007/0100651 A1 | 5/2007 | Ramer et al. |
| 2007/0106564 A1 | 5/2007 | Matotek et al. |
| 2007/0136211 A1* | 6/2007 | Brown et al. ................... 705/75 |
| 2007/0203836 A1 | 8/2007 | Dodin |
| 2007/0208671 A1* | 9/2007 | Brown et al. ................... 705/65 |
| 2007/0213991 A1 | 9/2007 | Bramante |
| 2007/0233615 A1 | 10/2007 | Tumminaro |
| 2007/0241183 A1* | 10/2007 | Brown et al. ................. 235/380 |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2008/0033793 A1* | 2/2008 | Roberts ........................... 705/14 |
| 2008/0040276 A1* | 2/2008 | Hammad et al. ................ 705/44 |
| 2008/0048025 A1* | 2/2008 | Fitzgerald et al. ............ 235/380 |
| 2008/0228611 A1* | 9/2008 | Lilly et al. ...................... 705/34 |
| 2009/0006262 A1* | 1/2009 | Brown et al. ................... 705/64 |

OTHER PUBLICATIONS

"US start-up gets set to challenge online payment giants." Electronic Payments International Oct. 1, 2007: Banking Information Source, ProQuest. Web. Jan. 15, 2011.*

"Migration of Card Fraud Incites Global Demand for EFT POS Terminals", PR Newsire. New York: Jan. 11, 2007.*

International Search Report, PCT/US 08/81576, dated Jan. 6, 2009 (2 pages).

Written Opinion of the International Searching Authority, PCT/US2008/81576; Jan. 6, 2009; 5 pages.

* cited by examiner

METHODS AND SYSTEMS FOR CARDHOLDER INITIATED TRANSACTIONS

CROSS REFERENCE TO RELATED APPLICATIONS

This application claims the benefit of U.S. Provisional Application No. 61/017,968 filed Dec. 31, 2007, which is hereby incorporated by reference in its entirety.

BACKGROUND OF THE INVENTION

This invention relates generally to transactions associated with a financial transaction card account and, more particularly, to network-based methods and systems for financial transactions initiated by an account holder, remotely from a bankcard network.

Historically, the use of "charge" cards for consumer transaction payments was at most regional and based on relationships between local credit issuing banks and various local merchants. The payment card industry has since evolved with the issuing banks forming associations (e.g., MasterCard) and involving third party transaction processing companies (e.g., "Merchant Acquirers") to enable cardholders to widely use charge cards at any merchant's establishment, regardless of the merchant's banking relationship with the card issuer.

Figure 1:
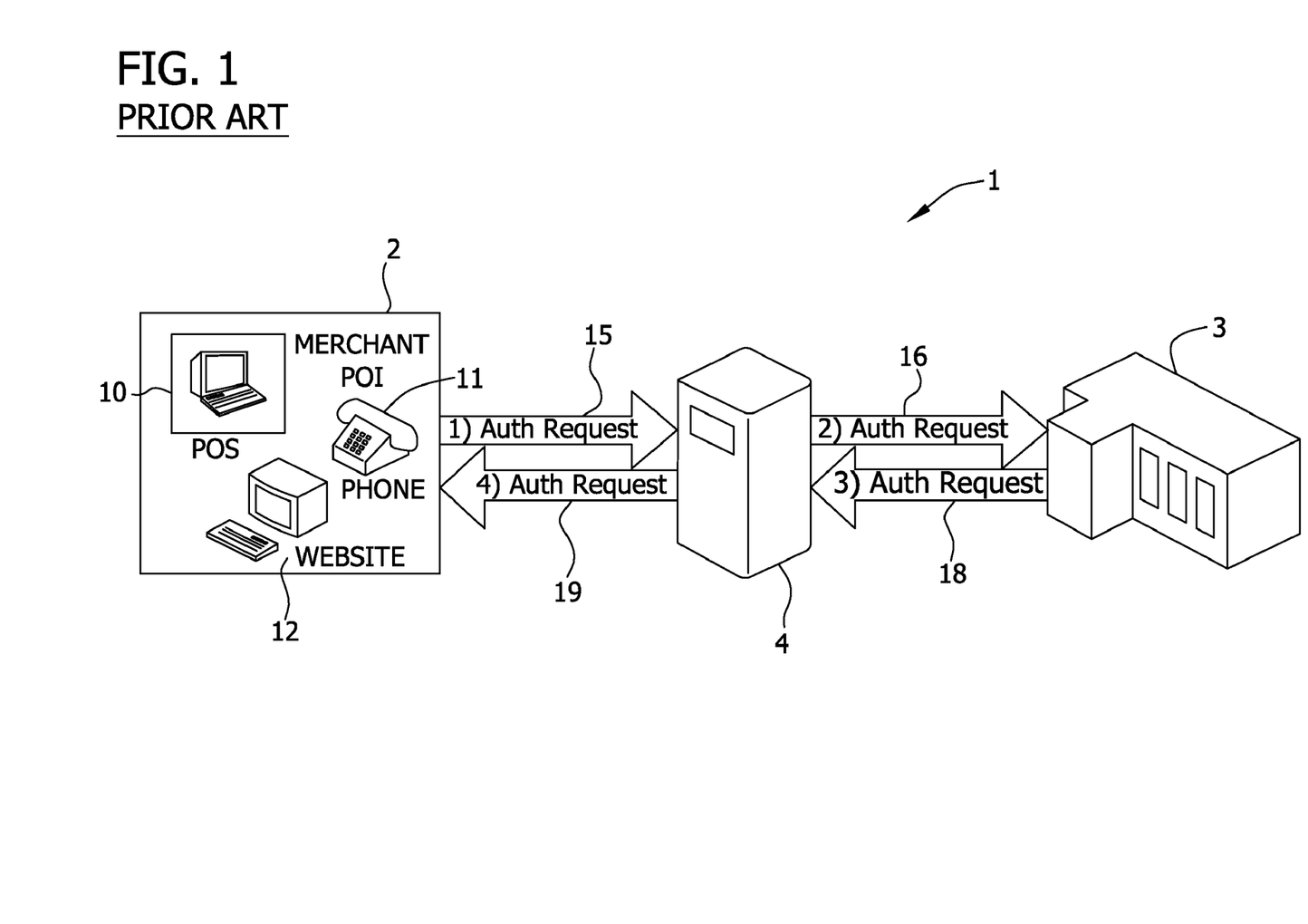
FIG. 1 is a schematic diagram illustrating a current authorization environment associated with financial transaction card accounts.
Figure 2:
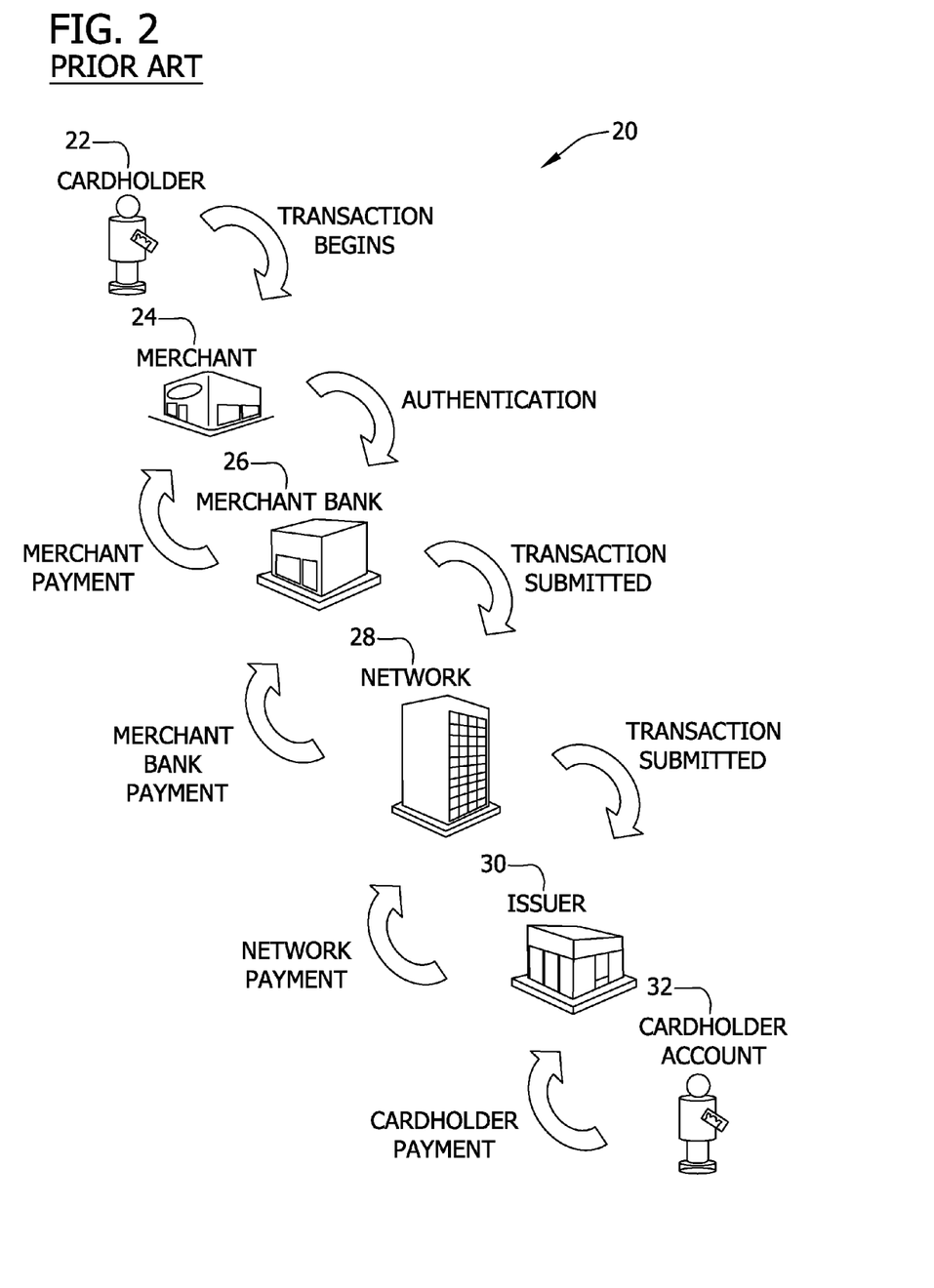
FIG. 2 is a schematic diagram illustrating an exemplary multi-party payment card industry system for enabling ordinary payment-by-card transactions in which the merchants and issuer do not need to have a one-to-one special relationship.

For example, FIGS. 1 and 2 of the present application shows an exemplary multi-party payment card industry system for enabling payment-by-card transactions in which the merchants and issuer do not need to have a one-to-one special relationship. Yet, various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. The special or customized issuer-merchant relationships often require direct communications between the parties for transaction authorization and/or clearing (e.g., for financial transactions). Further, the issuer may be required to maintain back office processes to manage the financial aspects of these special or customized relationships. Alternatively, the issuers may exploit communications through Merchant Acquirers to facilitate indirect communications with the merchants.

Traditional card account payment environments involve a merchant-controlled point of interaction (POI). Traditional points of interaction include point of sale devices, access through a merchant website, and interaction through a merchant telephone to initiate the authorization request. Collectively, these traditional points of interaction might be referred to as a merchant environment. For all interactions within this environment, an account number associated with a cardholder's financial transaction card is entered into the specific merchant's environment in order to conduct the transaction and/or obtain an authorization.

The specific cardholder interactions could include the cardholder giving his financial transaction card to a merchant to swipe or key into the merchant point of sale device, the merchant initiating a telephone call and entering the account number through interactive voice or through the telephone keypad, the cardholder himself swiping his card into the merchant's point of sale device, or the merchant or cardholder entering the account number into the merchant's website. Payments for approved transactions are managed with the issuer or merchant's acquirer based on the specific card payment network or closed loop environment.

One problem with the merchant environment is that the card and the account number are exposed to potential fraud. Though various security features for the card and account number are used, a more secure environment is needed. Consideration is now being given to ways to enable account holders to utilize their accounts remotely from the above listed devices, such that the account holder can initiate or "push" transactions which are then processed over the bankcard network without a merchant-controlled POI.

BRIEF DESCRIPTION OF THE INVENTION

In one aspect, a method of processing a cardholder-initiated financial transaction with a merchant using a cardholder controlled input device in communication with a payment card network and a database is provided. The cardholder uses a payment card issued to the cardholder by an issuer bank. The method includes the steps of storing merchant data within the database including data identifying the merchants registered to utilize the card network, and receiving from the input device transaction data relating to the financial transaction. The transaction data includes an authorization request and merchant identifying data that identifies the merchant involved in the transaction. The method further includes determining that the merchant identified by the merchant identifying data is registered to utilize the card network by comparing the transaction data with the merchant data stored in the database. The method also includes forwarding the authorization request to the issuer bank, receiving a response to the authorization request from the issuer bank, and automatically forwarding the response to at least the same input device.

In another aspect, a network-based system for processing a cardholder-initiated financial transaction with a merchant is provided. The financial transaction is initiated by the cardholder using a payment card issued by an issuer bank. The system includes a cardholder controlled input device, a database for storing information, and a server system configured to receive data from the input device and is coupled to the database. The server is further configured to store merchant data within the database including data identifying the merchants registered to utilize the system. The server is also configured to receive transaction data from the input device. The transaction data includes an authorization request and merchant identifying data that identifies the merchant involved in the transaction. The server determines that the merchant identified by the merchant identifying data is registered to utilize the system by comparing the transaction data with the merchant data stored in the database. The server forwards the authorization request to the issuer bank, and receives a response to the authorization request from the issuer bank. The server automatically forwards the response to at least the same input device.

In another aspect, a computer coupled to a database for processing a cardholder-initiated financial transaction with a merchant is provided. A cardholder controlled input device is in communication with the computer. The financial transaction is initiated by a cardholder using a payment card issued by an issuer bank. The computer is programmed to store merchant data within the database including data identifying the merchants registered to utilize a card network. The computer is also programmed to receive transaction data from the input device. The transaction data includes an authorization request and merchant identifying data that identifies the merchant involved in the transaction. The computer is further programmed to determine that the merchant identified by the merchant identifying data is registered to utilize the card network by comparing the transaction data with the merchant data stored in the database. The computer is also programmed to forward the authorization request to the issuer bank, receive a response to the authorization request from the issuer bank, and automatically forward the response to at least the same input device.

In another aspect, a computer program is embodied on a computer readable medium for processing a cardholder-initiated financial transaction with a merchant. A cardholder controlled input device is in communication with a card network and a database. The financial transaction is initiated by a cardholder using a payment card issued by an issuer bank. The computer program comprises at least one code segment that stores merchant data within the database including data identifying the merchants registered to utilize the card network. The program receives transaction data at the card network from the input device wherein the transaction data includes an authorization request and merchant identifying data that identifies the merchant involved in the transaction. The program determines that the merchant identified by the merchant identifying data is registered to utilize the card network by comparing the transaction data with the merchant data stored in the database. The program forwards the authorization request to the issuer bank, receives a response to the authorization request from the issuer bank, and automatically forwards the response to at least the same input device.

DETAILED DESCRIPTION OF THE INVENTION

Described in detail herein are exemplary embodiments of systems and processes for implementing remote initiation and authorization of financial transaction card transactions in the payment-by-card industry. The systems and processes include a cardholder that utilizes, for example, a payment card to make a purchase from a merchant outside of the merchant environment, while still utilizing the bankcard network with which the merchant is registered, such that the purchase made by the cardholder can be processed over the bankcard network.

The systems and processes described herein facilitate enabling a cardholder to initiate authorization of a transaction over a bankcard network. More specifically, the systems and processes described herein facilitate, for example, enabling a cardholder to use an input device such as a computer, a cellular telephone, or a PDA to input transaction data and an authorization request to a computer server or processor. A technical effect of the systems and processes described herein include at least one of (a) storing merchant data within a database including data identifying the merchants registered to utilize the card network; (b) receiving from an input device transaction data relating to the financial transaction, wherein the transaction data includes an authorization request and merchant identifying data that identifies the merchant involved in the transaction; (c) determining that the merchant identified by the merchant identifying data is registered to utilize the card network by comparing the transaction data with the merchant data stored in the database; (d) forwarding the authorization request to the issuer bank; (e) receiving a response to the authorization request from the issuer bank; and (f) automatically forwarding the response to at least the same input device.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other apparatus, assemblies and processes.

FIG. 1 is a schematic diagram of a conventional card account payment environment 1 that includes a merchant controlled point of interaction 2, a card issuer 3, and a transaction processor 4 interconnecting the point of interaction 2 and the card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed loop environment.

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe or chip on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
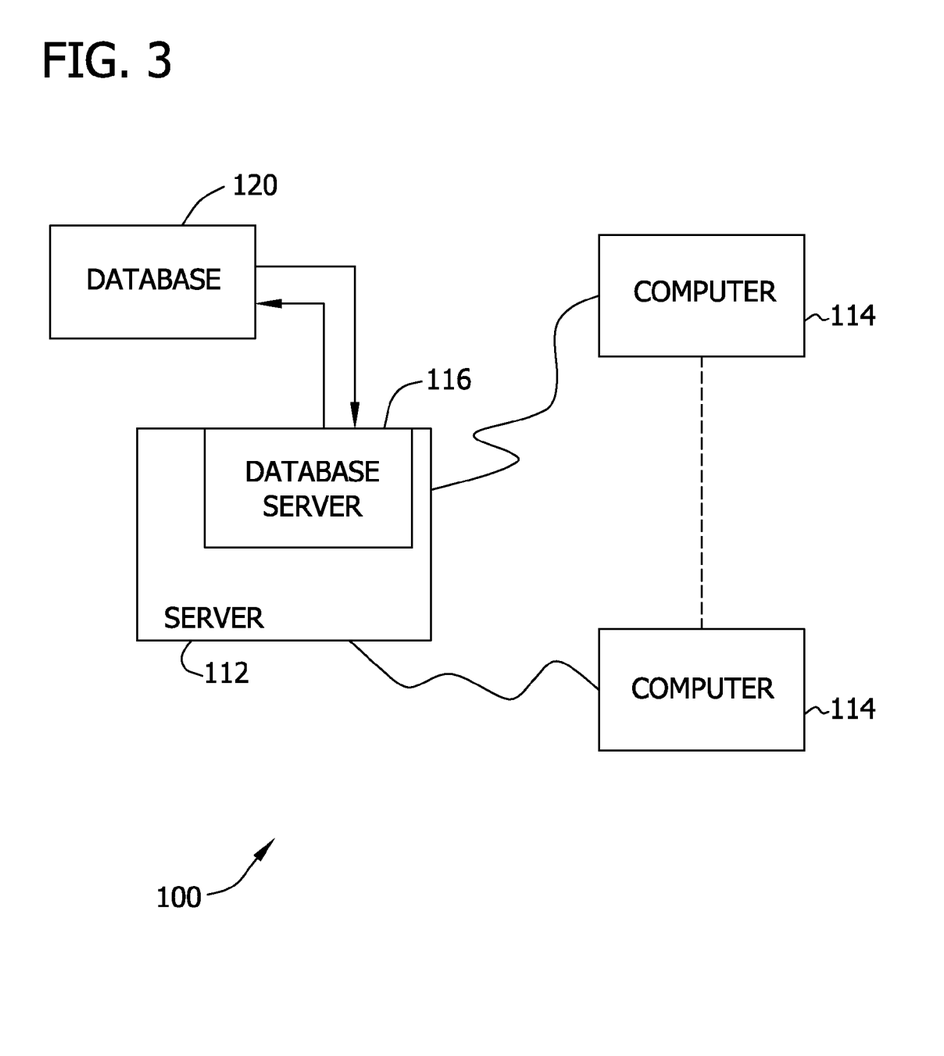
FIG. 3 is a simplified block diagram of an exemplary embodiment of a server architecture of a system in accordance with one embodiment of the present invention.

FIG. 3 is a simplified block diagram of an exemplary system 100 in accordance with one embodiment of the present invention. System 100 is a payment card system, which can be utilized by account holders as part of a process of initiating an authorization request and transaction as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases.

The embodiments illustrated and described herein as well as embodiments not specifically described herein but within the scope of aspects of the invention constitute exemplary means for the electronic processing of cardholder initiated financial transactions and, more particularly, constitute exemplary means for the electronic processing of financial transactions initiated by an account holder, remotely from a bankcard network. For example, server system 112 or client system 114, or any other similar computer device, programmed with computer-executable instructions illustrated in FIG. 3 constitutes exemplary means for the electronic processing of financial transactions initiated by an account holder, remotely from a bankcard network.

Figure 4:
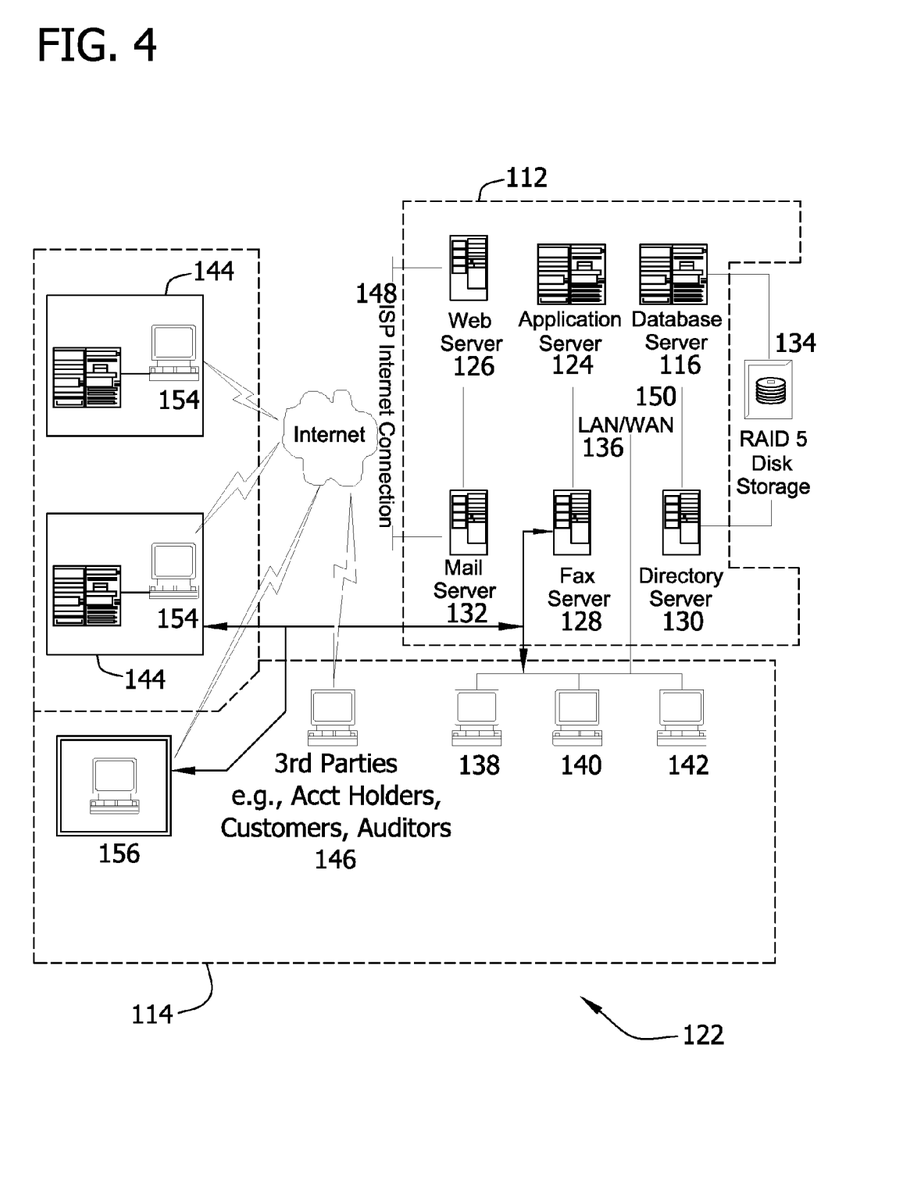
FIG. 4 is an expanded block diagram of an exemplary embodiment of a server architecture of a system in accordance with one embodiment of the present invention.

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

The technical effect of the systems and processes described herein is achieved by (a) storing merchant data within the database including data identifying the merchants registered to utilize the card network; (b) receiving from a cardholder controlled input device transaction data relating to the financial transaction, wherein the transaction data includes at least one of an authorization request, an account number, a transaction amount, and merchant identifying data for identifying the merchant involved in the transaction; (c) determining that the merchant identified by the merchant identifying data is registered to utilize the card network by comparing the transaction data with the merchant data stored in the database; (d) forwarding an authorization request to the issuer bank; (e) receiving a response to the authorization request from the issuer bank; and (f) automatically forwarding the response to at least the same cardholder controlled input device.

Figure 5:
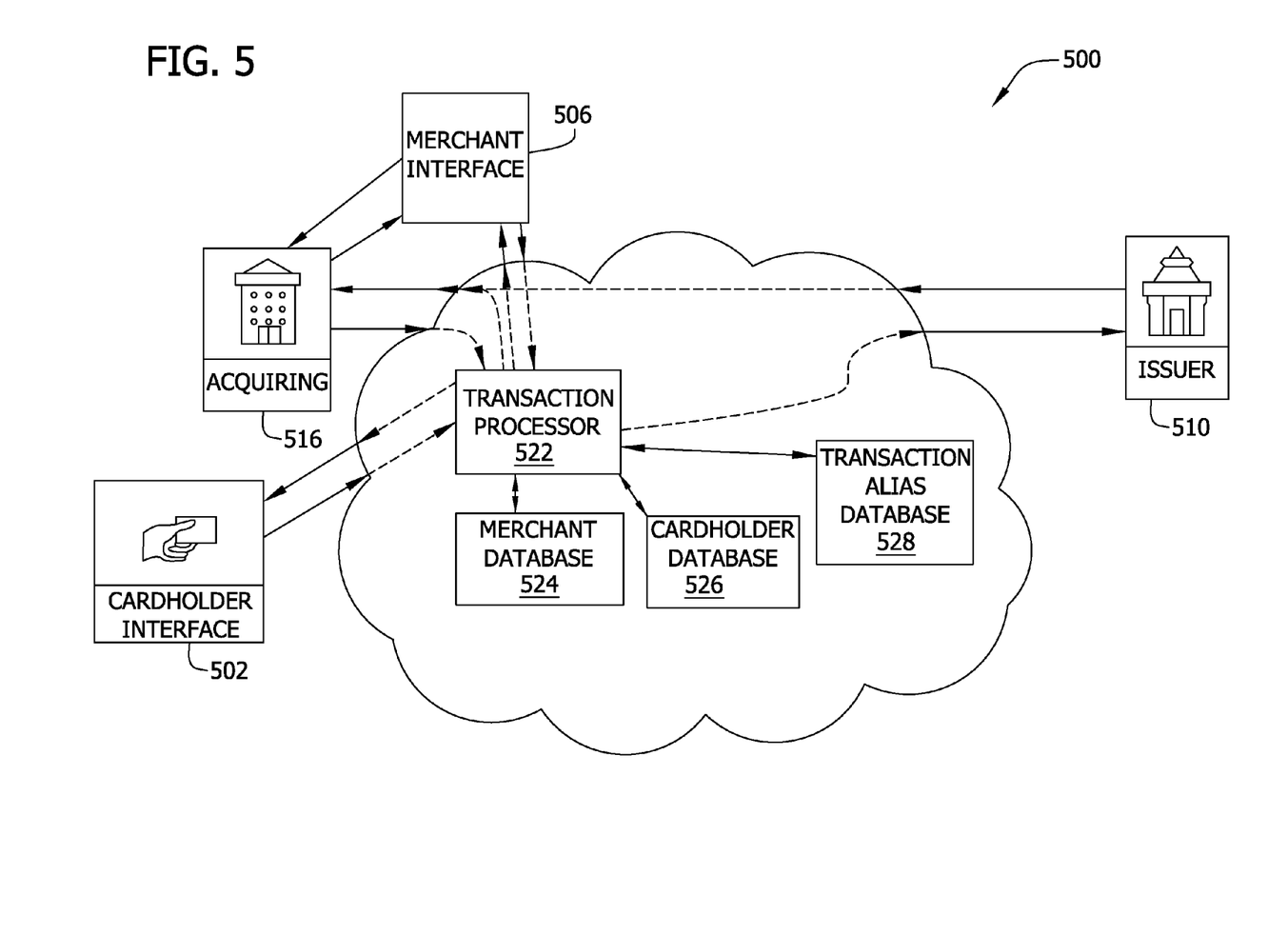
FIG. 5 is a schematic diagram illustrating an exemplary authorization process for remote initiation of transactions associated with a financial transaction card, in accordance with one embodiment of the present invention.

FIG. 5 is a schematic diagram of a card account payment system 500 of one embodiment of the invention. The system generally includes a cardholder interface 502 such as a computer, telephone, or PDA that enables the cardholder to initiate an authorization request using a cardholder controlled input device and without a merchant-controlled point of interaction. The system also includes a merchant interface 506, a card issuer 510, an acquiring bank 516 and an interchange 520 including a transaction processor 522 connected to a merchant database 524, a cardholder database 526 and a transaction alias database 528. The processor, among other functions, interacts directly with the cardholder interface, the merchant interface, and the card issuer.

The merchant database of this embodiment stores a merchant profile and a merchant control number for the merchant to give to cardholders in order to initiate the transaction authorization. The merchant profile generally stores information on each merchant including instructions on receiving authorization requests from cardholders, and for settling the transaction once the authorization is received from the issuer bank. The merchant profile may include instructions for the system to request additional data from the cardholder as part of the authorization process, such as driver number, location number, ticket number, invoice number or the like. The merchant profile may also include a merchant acknowledgment contact method such as an internet logon ID, email address, or cell phone number. The profile may require certain data (for example, a merchant representative number) in order to directly route a notification of the completed authorization to the merchant representative associated with the transaction.

The merchant profile may also include a variety of details to provide instructions for the payment to be made to the merchant for authorized transactions. For example, for certain merchants, once authorization is approved by the issuer bank, no further interaction with the merchant is needed to complete the transaction. That is, the interchange proceeds to handle the transaction, after authorization, as in a conventional transaction including settling the transaction. For other merchants, the merchant profile may be setup so that some confirmation from the merchant is needed before the transaction proceeds to settlement.

The merchant database also includes contact information, such as a telephone number, e-mail address or a merchant website for communicating with the merchant. For example, the merchant interface may simply be a mobile phone carried by a merchant representative, such as a salesperson. The merchant interface may be used to send an acknowledgment to the merchant that the transaction is authorized and/or completed.

The cardholder database of this embodiment stores cardholder identifying data. Generally, the identifying data is associated with or "mapped to" the cardholders actual account number. The identifying data may include a cardholder's phone number, e-mail address, logon identifying information, among other possible data. The cardholder database may include all necessary data for the cardholder so that, for example, the cardholder account number need not be stored in the cardholder interface. The identifying data may also include a history of the cardholder's transactions to aid in the merchant validation process described below.

The transaction alias database of this embodiment stores a unique transaction identifier for each transaction that is associated with the cardholder's account number. The transaction alias database may aid in ensuring that the account number is not revealed to the merchant or others involved in the process.

The cardholder receives the merchant control number from the merchant in order to initiate an authorization request through the interchange. The merchant control number can be transmitted to the cardholder in a variety of ways. For example, the control number can be given to the cardholder by a merchant representative or salesman at the time of the transaction. The control number may also be transmitted to the cardholder on an invoice received from the merchant. Further, the control number may be posted on the merchant's website, or may be posted at the merchant's place of business.

In one embodiment, the cardholder initiates the request by entering the card account number and expiration date, a dollar amount of the transaction, and the merchant control number into the cardholder interface. Depending on the merchant profile, additional identifying data, such as driver number, location number, ticket number, invoice number or the like may be required to complete the authorization request.

The cardholder interface may include a variety of devices, including a conventional fixed phone, a mobile phone, personal digital assistants (PDAs), and key fobs. The cardholder interface may also be any type of computer device, including a desktop or laptop computer, using any operating system. The information may be sent, for example, as a text message, e-mail or keyed in using the numbers on a fixed phone or mobile phone. The information may be transmitted from the interface through any means, including over landline, cell networks, the internet or the like. Any of these devices can be used to interact with the processor of the interchange. As an example, the user may dial a phone number associated with the system and, in response to voice prompts, key in the account number and expiration date, the dollar amount of the transaction and the merchant control number.

Rather than keying in all the information required for an authorization request each time the user makes a purchase, portions of the required data, e.g., the cardholder's account number and expiration date and/or the merchant control number, could be preloaded and securely held on the cardholder's computer, PDA, smart phone or cell phone. For example, a computer or PDA may have a software application thereon that securely holds the cardholder's information. The application may be programmed to transmit the information to the transaction processor at the touch of a button, or a few keystrokes. Further, the merchant control number could be automatically loaded onto the cardholder's cell phone using, for example, near field communications at the merchant's location when the transaction is processed.

After the authorization request is received, the request may be matched in the merchant database to ensure a valid merchant control number has been entered. If the number is not valid, a response is sent to the cardholder requesting another merchant control number. The response is sent to the same device the cardholder used to initiate the request. The system may also "echo back" or respond with certain data from the merchant profile in order for the cardholder to confirm that he or she is initiating a transaction with the proper merchant. This validation of merchant control number step may be omitted however. For example, if the cardholder has previously initiated an authorization request with the same merchant and such data is stored in the cardholder interface, the system may assume that the request is valid.

The system may also respond to the cardholder with a request for additional transaction specific data, based on the merchant profile. Once the additional data is provided, the authorization request is processed and routed or forwarded to the card issuer as in a conventional transaction as described above. This cardholder-initiated request is forwarded to the card issuer as a request for authorization. Upon verifying a status of the cardholder account, the card issuer responds to the transaction processor with an authorization response which is received by the transaction processor. The processor then forwards an acknowledgment of authorization or approval to the cardholder interface, and forwards an acknowledgment to the merchant interface to advise the merchant that authorization is complete. Thereafter, the merchant and cardholder can complete the transaction.

Note that the authorization acknowledgment to the merchant may provide only a transaction identifier to the merchant, instead of the card account number, e.g., for security reasons. The cardholder's account number may not be revealed to the merchant to enhance the security of the transaction and inhibit theft of the card account number.

The authorization request enables the interchange to capture the transaction data in the same or similar manner as in conventional card transaction. Upon receipt of the request, the interchange has at least the cardholder's account number and expiration date, the transaction amount, and the merchant identification or control number. The card transaction can then proceed in the conventional manner.

The card transaction is then suitably processed as described above in FIGS. 3-4 using systems 100 and 122. After the transaction data is captured, the transaction is cleared and settled between the merchant, the acquiring bank, and the issuer in a conventional manner as discussed above.

In an alternative embodiment, the cardholder initiates the transaction by entering the merchant control number, the amount of the purchase, and any optional data. The transaction processor accesses the cardholder database to identify the cardholder account number. The merchant database and/or the cardholder database are accessed to validate the merchant control number. The transaction processor submits an authorization request to the network or interchange, the request including the merchant control number and the cardholder account number. After receiving a response from the issuer, the processor interacts with the transaction alias database to provide secure confirmations to the merchant interface and to the cardholder interface. The processor then submits a clearing record to the acquirer. The clearing record may omit the account number using secure transaction details so that the account number is not even revealed to the acquirer. The acquirer submits a conventional clearing record, and if secure transaction details were provided, the interchange converts the details to include the account number and forwards the details to the issuer to post.

The following are examples of transactions initiated and processed in accordance with the invention:

A cardholder orders a pizza from a merchant for home delivery. When the pizza is delivered by the delivery person, the cardholder is given the merchant's control number. The cardholder calls the interchange processor to initiate an authorization request. The cardholder keys in to the phone the merchant control number, the transaction amount, the card account number and expiration date in response to voice prompts. Alternatively, the information may be sent as a text message. The merchant control number is validated in the merchant database, and if valid, the request is forwarded to the issuer bank. If the request is approved, the cardholder receives an automated voice response notifying him of the approval. Simultaneously, the pizza delivery person receives a call, or a text message, that the authorization request has been approved and can thereby complete the delivery. The validation and approval steps occur in a matter of seconds so that the transaction can be expeditiously completed. During the transaction, the pizza delivery person has not received the cardholder's account number, but is assured of payment through the interchange. Moreover, the cardholder is assured that his account number has not been revealed to the pizza delivery person.

Moreover, the methods and systems described herein may be used to initiate and process alternative home delivery, service call transactions, or other time-based transactions. For example, a customer may schedule and/or pay for a taxi service, thereby eliminating the need for taxis to include wireless POS devices yet still enabling the taxis to receive secure authorized payments. In another example, a customer visits a restaurant and wishes to pay for a meal using a credit card. Rather than waiting for a server to gather the card, execute the transaction, and return the card, the customer may simply key in a merchant identifier associated with the restaurant. In addition, a customer may pay for parking by keying in a merchant identifier associated with a particular parking space. In some embodiments, the transaction processor may be programmed to manage transactions types such as parking in order to provide functions such as text messaging a cardholder when a parking meter is nearing an expiration time and enabling the cardholder to immediately add additional time.

In another example, a patient visits a doctor and receives an invoice from the doctor's office. The invoice includes a merchant control number for direct payment of the invoice by the cardholder. Rather than pay the invoice by check, or rather than reveal his credit card account number to the patient's office, the patient can simply send an e-mail message to the interchange processor including the account number, expiration date, amount and merchant control number. After validating the request and gaining approval from the issuer bank, the interchange processor responds with an e-mail to the patient confirming that the request has been received and approved. The interchange processor also sends confirmation to the doctor's office.

As another example, a cardholder may perform traditional bill paying activities using the embodiments described herein. The merchant provides a merchant control number to the cardholder for direct payment of a bill. Rather than pay the bill using a process driven by an Automated Clearing House (ACH), mailing a payment slip and check, calling the merchant to provide a card number, or setting up a recurring payment, the cardholder may initiate a bill payment transaction by sending an account number, expiration date, bill amount, and merchant control number to the interchange processor via an e-mail, an SMS text message, or using a phone application. After validating the request and obtaining approval from the issuer bank, the interchange processor responds with a return e-mail, SMS text message, or reply to the phone application. The interchange processor also sends confirmation to the merchant that the bill has been paid.

The card account payment system of this embodiment integrates into the existing methods that manage financial transactions on the card payment network or interchange. In this way, the system minimizes the need for any new infrastructure to implement the system. The merchant and acquiring banks need not change their existing POS devices and software in this system. The system also eliminates or reduces the need for each merchant to have its own merchant-controlled point of interaction or POS device function to initiate the authorization request. Moreover, the merchant's security is not jeopardized by the system because the merchant control number cannot be used to withdraw money from the merchant's account with the acquiring bank.

The system enables the cardholder to "push" or initiate the transaction himself or herself, so that he or she need not rely on the merchant or a merchant website to initiate the authorization request. In this way, the cardholder is given more control over transactions, and added security in that he or she is not revealing an account number to a merchant. These advantages will result in more financial transactions through the interchange.

Embodiments of this invention also allow cardholders to optionally pre-register an account or use a secure cell phone application. In both cases, the cardholder interface enables storage of cardholder account data in order to minimize entry of account data at the time of the transaction. Alternatively, the cardholder interface enables cardholders to enter the account data as part of each authorization request process. Cardholders who pre-register or use the secure cell phone application may also store merchant history, including the merchant data requirements for specific merchants in order to streamline the authorization process. Storing merchant history may also eliminate the validation step with the merchant database for each subsequent authorization initiation.

While the invention has been described in terms of various specific embodiments, those skilled in the art will recognize that the invention can be practiced with modification within the spirit and scope of the claims.

What is claimed is:

1. A method of processing a cardholder-initiated financial transaction with a merchant using a cardholder controlled input device in communication with a payment card network and a database, the cardholder using a payment card issued to the cardholder by an issuer bank, said method comprising the steps of:
   storing merchant data within the database including data identifying the merchants registered to utilize the payment card network;
   receiving transaction data and an authorization request at the payment card network from the cardholder controlled input device, the transaction data relating to the financial transaction, the transaction data including merchant identifying data that identifies the merchant involved in the transaction, the authorization request generated by the cardholder controlled input device based at least in part on the transaction data and requests requesting an authorization message from the issuer bank indicating whether the cardholder has sufficient funds to complete the transaction, the cardholder controlled input device configured to transmit the transaction data and the authorization request to the payment card network without input from a merchant point-of-sale (POS) device in said transmission;
   determining that the merchant identified by the merchant identifying data is registered to utilize the payment card network by comparing the transaction data with the merchant data stored in the database;
   forwarding the authorization request to the issuer bank;
   receiving, at the payment card network, the authorization message from the issuer bank, the authorization message including one of an approval and a denial of the authorization request; and
   automatically forwarding the authorization message to at least the same cardholder controlled input device.

2. A method according to claim 1 wherein receiving transaction data further comprises:
   presenting the merchant identifying data and a transaction amount to the cardholder by the merchant for inputting into the cardholder controlled input device; and
   receiving at the payment card network, exclusively from the cardholder controlled device, the merchant identifying data, an account number and the transaction amount.

3. A method according to claim 1 wherein determining that the merchant identified is registered to utilize the card network further comprises determining whether the transaction data requires further information from the cardholder to complete the transaction, and requesting said further information from the cardholder.

4. A method according to claim 1 wherein determining that the merchant identified is registered to utilize the card network further comprises determining whether the merchant identifying data received from the cardholder is valid.

5. A method according to claim 4 further comprising forwarding a request to the cardholder for different merchant identifying data if the merchant identifying data is determined to be invalid.

6. A method according to claim 1 wherein the response to the authorization request is also forwarded to the merchant without revealing the cardholder's account number.

7. A method according to claim 1 further comprising routing transaction data from the authorization request through the card network and performing a settlement process between the issuer bank and the merchant.

8. A method according to claim 7 further comprising capturing and accumulating transactions into batches and settling such batches as a group.

9. A method according to claim 1 wherein the transaction is a time-based transaction, and wherein said method further comprises providing prompts to the cardholder to initiate the transaction.

10. A system for processing a cardholder-initiated financial transaction with a merchant over a payment card network, the financial transaction initiated by the cardholder using a payment card issued by an issuer bank, said system comprising:
   a cardholder controlled input device;
   a database for storing information; and
   a server system configured to receive data from said cardholder controlled input device and coupled to said database, said server further configured to:
      store merchant data within the database including data identifying the merchants registered to utilize said system;
      receive transaction data and an authorization request from the cardholder controlled input device, wherein the transaction data includes merchant identifying data that identifies the merchant involved in the transaction, the authorization request generated by the cardholder controlled input device based at least in part on the transaction data and requests an authorization message from the issuer bank indicating whether the cardholder has sufficient funds to complete the transaction, the cardholder controlled input device configured to transmit the transaction data and the authorization request to the server without input from a merchant point-of-sale (POS) device in said transmission;
      determine that the merchant identified by the merchant identifying data is registered to utilize said system by comparing the transaction data with the merchant data stored in said database;
      forward the authorization request to the issuer bank;
      receive the authorization message from the issuer bank, the authorization message including one of an approval and a denial of the authorization request; and
      automatically forward the authorization message to at least said same cardholder controlled input device.

11. A system according to claim 10 wherein said server is further configured to determine whether the transaction data requires further information from the cardholder to complete the transaction and to request the further information from the cardholder via the cardholder controlled input device.

12. A system according to claim 10 wherein the transaction data includes at least one of an account number and a transaction amount.

13. A system according to claim 12 wherein said server is further configured to determine whether the merchant identifying data received from the cardholder is valid.

14. A system according to claim 13 wherein said server is further configured to forward a request to the cardholder for different merchant identifying data if the merchant identifying data is determined to be invalid.

15. A system according to claim 14 wherein said server is further configured to forward the response to the authorization request to the merchant without revealing the cardholder's account number.

16. A system according to claim 15 wherein said server is further configured to route transaction data from the authorization request through said system and perform a settlement process between the issuer bank and the merchant.

17. A system according to claim 16 wherein said server is further configured to capture and accumulate transactions into batches and settling such batches as a group.

18. A system according to claim 10 wherein the transaction data includes an account number and a transaction amount, and wherein said server is further configured to receive the merchant identifying data, the account number, and the transaction amount exclusively from the cardholder controlled input device.

19. A computer coupled to a database for processing a cardholder-initiated financial transaction with a merchant using a cardholder controlled input device in communication with said computer, the financial transaction initiated by a cardholder using a payment card issued by an issuer bank, said computer associated with a payment card network, said computer programmed to:
   store merchant data within the database including data identifying the merchants registered to utilize the payment card network;
   receive transaction data and an authorization request from the cardholder controlled input device, wherein the transaction data includes merchant identifying data that identifies the merchant involved in the transaction, the authorization request generated by the cardholder controlled input device based at least in part on the transaction data and requests an authorization message from the issuer bank indicating whether the cardholder has sufficient funds to complete the transaction, the cardholder controlled input device configured to transmit the transaction data and the authorization request to the computer without input from a merchant point-of-sale (POS) device in said transmission;
   determine that the merchant identified by the merchant identifying data is registered to utilize the payment card network by comparing the transaction data with the merchant data stored in the database;
   forward the authorization request to the issuer bank;
   receive the authorization message from the issuer bank, the authorization message including one of an approval and a denial of the authorization request; and
   automatically forward the authorization message to at least the same cardholder controlled input device.

20. A computer according to claim 19 wherein the transaction data further includes at least one of an account number and a transaction amount.

21. A computer according to claim 19 wherein said computer is programmed to determine whether the merchant data requires more information from the cardholder, and thereafter request the information from the cardholder.

22. A computer according to claim 21 wherein said computer is programmed to determine whether the merchant identifying data received from the cardholder is valid.

23. A computer according to claim 19 wherein said computer is programmed to forward a request to the cardholder for different merchant identifying data if the merchant identifying data is determined to be invalid.

24. A computer according to claim 19 wherein said computer is programmed to forward the response to the authorization request to the merchant without revealing the cardholder's account number.

25. A computer according to claim 19 wherein said computer is programmed to route transaction data from the authorization request through the card network and perform a settlement process between the issuer bank and the merchant.

26. A computer according to claim 19 wherein said computer is programmed to capture and accumulate transactions into batches and settling such batches as a group.

27. A computer according to claim 19 wherein the transaction is a time-based transaction, and wherein said computer is programmed to prompt the cardholder to initiate the transaction.

28. A non transitory computer readable medium containing a computer program for processing a cardholder-initiated financial transaction with a merchant using a cardholder controlled input device in communication with a card network and a database, the financial transaction initiated by a cardholder using a payment card issued by an issuer bank, said program comprising:
- a code segment for storing merchant data within the database including data identifying the merchants registered to utilize the card network;
- a code segment for receiving transaction data and an authorization request at the card network from the cardholder controlled input device, wherein the transaction data includes merchant identifying data that identifies the merchant involved in the transaction, the authorization request generated by the cardholder controlled input device based at least in part on the transaction data and requests an authorization message from the issuer bank that indicates that the cardholder has sufficient funds to complete the transaction, the cardholder controlled input device configured to transmit the transaction data and the authorization request to the payment card network without input from a merchant point-of-sale (POS) device in said transmission;
- a code segment for determining that the merchant identified by the merchant identifying data is registered to utilize the card network by comparing the transaction data with the merchant data stored in the database;
- a code segment for forwarding the authorization request to the issuer bank;
- a code segment for receiving the authorization message from the issuer bank, the authorization message including one of an approval and a denial of the authorization request; and
- a code segment for automatically forwarding the authorization message to at least the same cardholder controlled input device.

29. A non-transitory computer readable medium in accordance with claim 28, wherein said program further comprises at least one code segment to determine whether the merchant data requires more information from the cardholder, and thereafter request the information from the cardholder.

30. A non-transitory computer readable medium in accordance with claim 28, wherein said program further comprises at least one code segment to determine whether the merchant identifying data received from the cardholder is valid.

31. A non-transitory computer readable medium in accordance with claim 28, wherein said program further comprises at least one code segment to forward a request to the cardholder for different merchant identifying data if the merchant identifying data is determined to be invalid.

32. A system according to claim 10 further comprising a merchant interface, wherein said server system is further configured to automatically forward the authorization message from the issuer bank to the merchant interface.

33. A system according to claim 32, wherein the cardholder controlled input device is physically proximate to the merchant interface.

* * * * *